(12) United States Patent
Spexarth

(10) Patent No.: US 7,295,884 B1
(45) Date of Patent: Nov. 13, 2007

(54) SYSTEM AND METHOD OF DESIGNING A LOAD BEARING LAYER OF AN INFLATABLE VESSEL

(75) Inventor: Gary R. Spexarth, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 395 days.

(21) Appl. No.: 11/158,354

(22) Filed: Jun. 20, 2005

(51) Int. Cl.
*G06F 19/00* (2006.01)
*B64G 1/00* (2006.01)

(52) U.S. Cl. .................. 700/97; 700/117; 244/158.3; 244/159.2; 244/159.4; 703/22

(58) Field of Classification Search ............. 700/97, 700/117; 244/158.1–159.6; 703/22
See application file for complete search history.

(56) References Cited

U.S. PATENT DOCUMENTS

| | | | |
|---|---|---|---|
| 3,666,289 A * | 5/1972 | Magyar | 280/740 |
| 5,641,135 A * | 6/1997 | Stuart et al. | 244/172.6 |
| 5,680,590 A | 10/1997 | Parti | |
| 5,917,730 A | 6/1999 | Rittie et al. | |
| 5,920,491 A | 7/1999 | Hibbitt et al. | |
| 5,995,728 A | 11/1999 | Forman | |
| 6,051,029 A | 4/2000 | Paterson et al. | |
| 6,069,629 A | 5/2000 | Paterson et al. | |
| 6,272,447 B1 | 8/2001 | Gavin et al. | |
| 6,389,375 B1 | 5/2002 | Thomsen et al. | |
| 6,442,515 B1 | 8/2002 | Varma et al. | |
| 6,560,569 B1 | 5/2003 | Abu El Ata | |
| 6,647,668 B1 | 11/2003 | Cohee et al. | |
| 6,725,184 B1 | 4/2004 | Gadh et al. | |
| 6,735,556 B2 | 5/2004 | Copel | |
| 6,738,736 B1 | 5/2004 | Bond | |
| 6,760,693 B1 | 7/2004 | Singh et al. | |
| 6,763,324 B1 | 7/2004 | Pittman et al. | |
| 6,768,973 B1 | 7/2004 | Patel | |

* cited by examiner

*Primary Examiner*—Kidest Bahta
*Assistant Examiner*—Sheela Rao
(74) *Attorney, Agent, or Firm*—Theodore U. Ro

(57) ABSTRACT

A computer-implemented method is provided for designing a restraint layer of an inflatable vessel. The restraint layer is inflatable from an initial uninflated configuration to an inflated configuration and is constructed from a plurality of interfacing longitudinal straps and hoop straps. The method involves providing computer processing means (e.g., to receive user inputs, perform calculations, and output results) and utilizing this computer processing means to implement a plurality of subsequent design steps. The computer processing means is utilized to input the load requirements of the inflated restraint layer and to specify an inflated configuration of the restraint layer. This includes specifying a desired design gap between pairs of adjacent longitudinal or hoop straps, whereby the adjacent straps interface with a plurality of transversely extending hoop or longitudinal straps at a plurality of intersections. Furthermore, an initial uninflated configuration of the restraint layer that is inflatable to achieve the specified inflated configuration is determined. This includes calculating a manufacturing gap between pairs of adjacent longitudinal or hoop straps that correspond to the specified desired gap in the inflated configuration of the restraint layer.

37 Claims, 13 Drawing Sheets

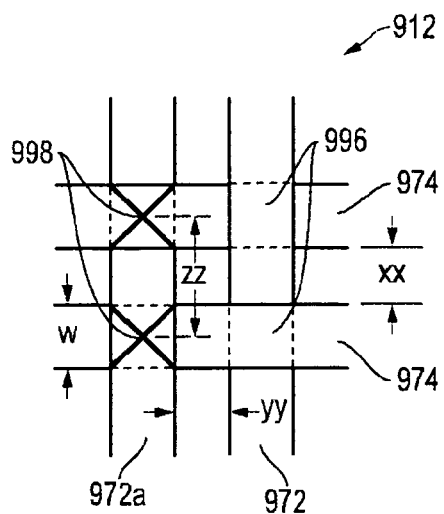
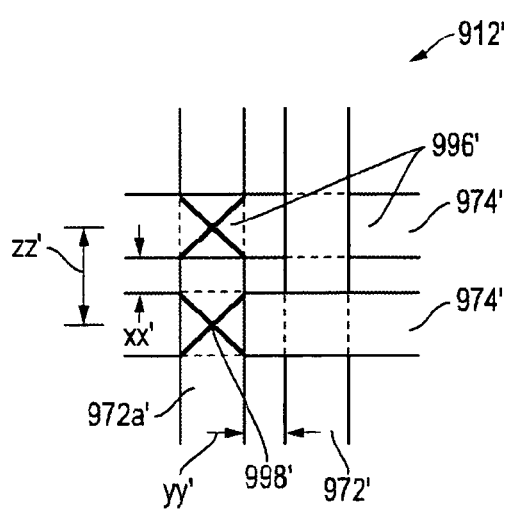
FIG. 12    FIG. 12A
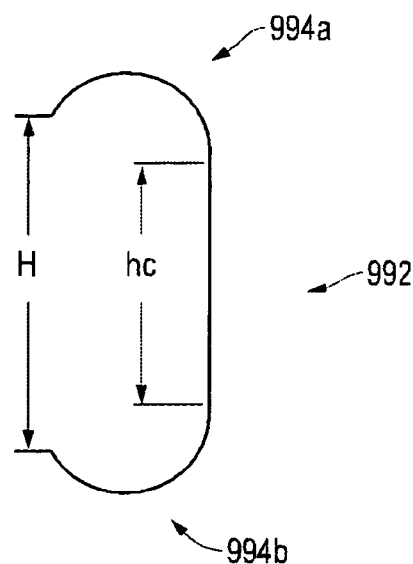
FIG. 9B

| | 1 | 2 | 3 | 4 | 5 | 6 | 7 |
|---|---|---|---|---|---|---|---|
| 1 | "DASH NO" | "NAME" | "NAME" | "A" | "B" | "C" | "D" |
| 2 | -1 | T_upr | 24 | 7 | 3 | 6.5 | 22.51 |
| 3 | -3 | T_upr | 25 | 6.4 | 1.98 | 5.42 | 22.18 |
| 4 | -5 | T_upr | 26 | 6.31 | 1.94 | 5.34 | 21.84 |
| 5 | -7 | T_upr | 27 | 6.21 | 1.9 | 5.26 | 21.48 |
| 6 | -9 | T_upr | 28 | 6.11 | 1.85 | 5.19 | 21.12 |
| 7 | -11 | T_upr | 29 | 6.01 | 1.81 | 5.1 | 20.75 |
| 8 | -13 | T_upr | 30 | 5.91 | 1.77 | 5.02 | 20.37 |
| 9 | -15 | T_upr | 31 | 5.8 | 1.72 | 4.94 | 19.98 |
| 10 | -17 | T_upr | 32 | 5.69 | 1.68 | 4.85 | 19.59 |
| 11 | -19 | T_upr | 33 | 5.58 | 1.63 | 4.76 | 19.19 |
| 12 | -21 | T_upr | 35 | 5.35 | 1.54 | 4.55 | 18.36 |
| 13 | -23 | T_upr | 36 | 5.23 | 1.49 | 4.46 | 17.94 |
| 14 | -25 | T_upr | 37 | 5.12 | 1.44 | 4.4 | 17.51 |
| 15 | -27 | T_upr | 38 | 5 | 1.39 | 4.3 | 17.08 |
| 16 | -29 | T_upr | 39 | 4.88 | 1.34 | 4.21 | 16.64 |
| 17 | -31 | T_upr | 40 | 4.76 | 1.29 | 4.11 | 16.2 |
| 18 | -33 | T_upr | 41 | 4.63 | 1.24 | 4.02 | 15.76 |
| 19 | -35 | T_lwr | 24 | 7 | 1 | 6.5 | 22.51 |

SYSTEM AND METHOD OF DESIGNING A LOAD BEARING LAYER OF AN INFLATABLE VESSEL

The invention described herein was made by an employee of the United States Government and may be manufactured and used by or for governmental purposes without the payment of any royalties thereon or therefor.

FIELD OF THE INVENTION

This invention relates generally to a load bearing layer of an inflatable vessel, such as an inflatable habitation or laboratory module for use in space flight. The present invention further relates to a system and method of designing the vessel or similarly inflatable vessel and/or the load bearing layer. More particularly, the invention relates to a system and method of designing, assembling, and/or manufacturing a restraint layer for such an inflatable vessel or similar structure.

BACKGROUND OF THE INVENTION

U.S. Pat. Nos. 6,231,010 and 6,547,189 are directed to the construction of an inflatable hybrid spacecraft module. The spacecraft module is lightweight, collapsible, and compact prior to space flight, but may be inflated and enlarged to provide an adequate volume for human habitation, laboratory work, and/or space flight. The present system and method are particularly applicable to the design and manufacture of a restraint layer for such a module. Accordingly, the specification of each these patents serves well as a source of background information and may be referred to for background.

SUMMARY OF THE INVENTION

In one aspect of the present invention, a computer-implemented method is provided for designing a restraint layer of an inflatable vessel. The restraint layer is constructed from a plurality of interfacing first (longitudinal) straps and second (hoop) straps and is inflatable from an initial uninflated configuration to an inflated configuration. The method involves providing computer processing means (e.g., to receive user inputs, perform calculations, and output results) and utilizing the computer processing means to implement a plurality of subsequent design steps. The computer processing means is utilized to input the loading requirements of the inflated restraint layer. It is also utilized to specify an inflated configuration of the restraint layer, including a design gap between pairs of adjacent generally vertical or generally horizontal straps, whereby the adjacent straps interface with a plurality of transversely extending generally horizontal or generally vertical straps at a plurality of intersections. Furthermore, the computer processing means is utilized to determine an initial, uninflated configuration of the restraint layer that is inflatable to achieve the specified inflated configuration. This includes calculating a manufacturing gap between pairs of adjacent generally vertical or generally horizontal straps that correspond to the specified gap in the inflated configuration of the restraint layer.

Preferably, the manufacturing gap (between the adjacent straps) is calculated by first calculating the load applied along the transversely extending straps during inflation, based on the user inputs. Next, a percentage elongation is calculated in the transversely extending straps in the vicinity of the adjacent straps (e.g., about the intersections), based, at least partly, on the calculated loads. The specified design gap (between the adjacent straps) is then reduced by application of the percent elongation. This reduction determines a manufacturing gap between the two adjacent straps that corresponds to the specified design gap (i.e., becomes the specified design gap upon inflation of the restraint layer to the inflated configuration).

In another aspect of the invention, a method of manufacturing a restraint layer of an inflatable vessel is provided. The restraint layer is constructed of a web of a set of first straps (e.g., longitudinal straps) and a set of second straps (e.g., hoop straps) that transversely extend relative to the first straps and interfaces therewith at a plurality of intersections. The method includes specifying an inflated configuration of the restraint layer including the design gaps between adjacent straps of the web and indexing locations between the first straps and second straps. Furthermore, the specifications of an initial, uninflated configuration of the restraint layer is provided based on the inflated configuration. These specifications include the manufacturing gaps that correspond to the specified design gaps, such that the initial, uninflated configuration of the restraint layer is inflatable to achieve the inflated configuration and the specified design gaps therefor. Furthermore, the method entails assembling the straps of the initial uninflated configuration including spacing adjacent straps according to the manufacturing gaps.

In yet another aspect of the invention, a system for manufacturing a restraint layer of an inflatable vessel is provided. This restraint layer is constructed of a plurality of interfacing longitudinal straps and hoop straps and is inflatable from an initial, uninflated configuration to an inflated configuration. The system includes a plurality of tables that lists the straps of a strap type and, for each strap, provides a unique identifier and manufacturing dimensions. The system further includes a plurality of templates for marking indexing locations on a strap. Each template is identifiable with at least one of the straps in one of the tables and is positionable adjacent the identified straps in the initially, uninflated configuration, thereby locating indexing locations thereon. The tables are preferably computer generated and further specifies the relative positions of the straps.

BRIEF DESCRIPTION OF THE DRAWINGS

The present invention is described in connection with the attached drawings, which illustrate and explain its various aspects. In particular.

FIG. 9B is a vertical cross sectional outline of one-half of the restraint layer in FIG. 9;

FIG. 12 is a detail illustration of a section of the restraint layer in the inflated configuration;

FIG. 12A is a detail illustration of the section in FIG. 12 in the initial, uninflated configuration;

FIG. 14 is a table representative of an output of manufacturing specifications generated by a computer-implemented method, according to the present invention;

FIG. 16 is a representative strap marking table generated by the method according to the present invention;

DETAILED DESCRIPTION OF THE PREFERRED EMBODIMENTS

Figure 1:
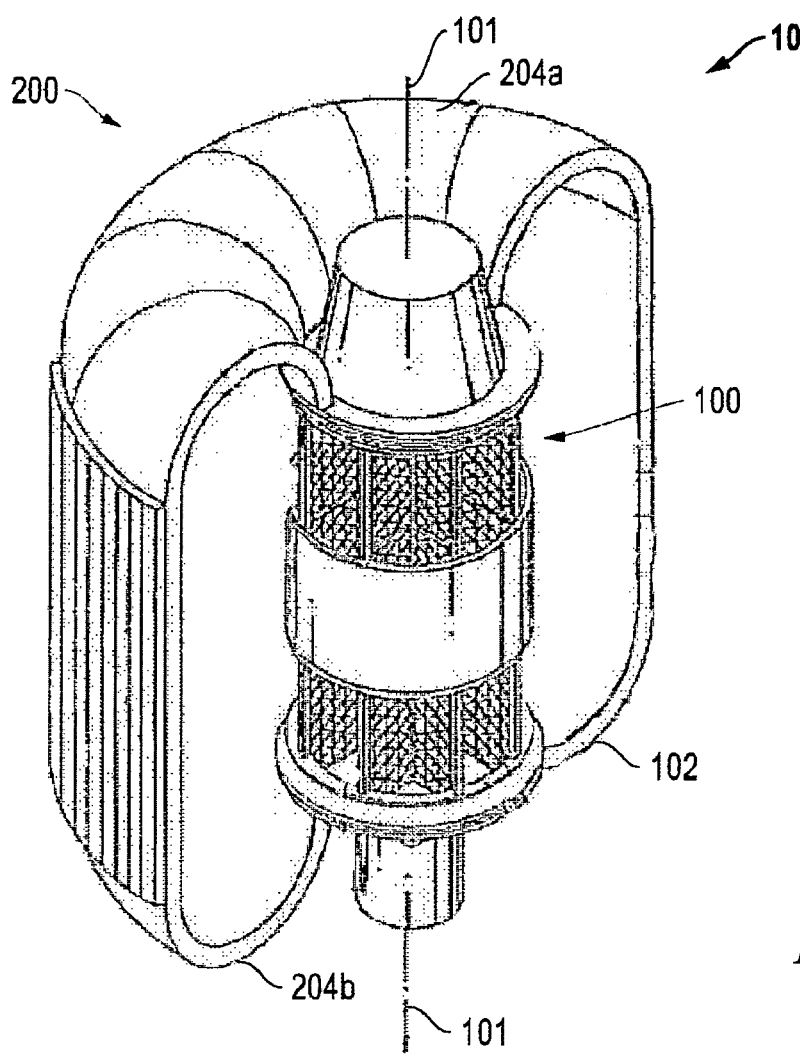
FIG. 1 is a partial isometric view of an inflatable vessel, in the deployed or inflated configuration.
Figure 2:
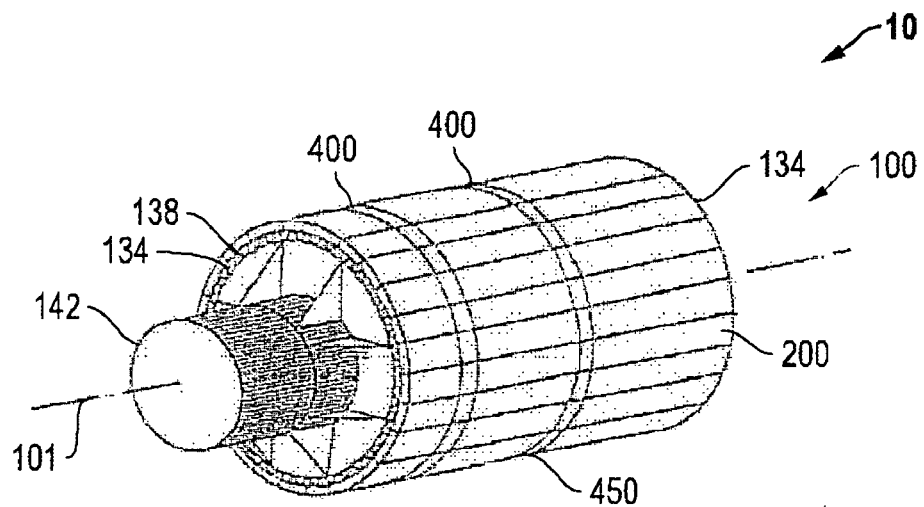
FIG. 2 is a perspective view of the inflatable vessel, in the launch or uninflated configuration.
Figure 4:
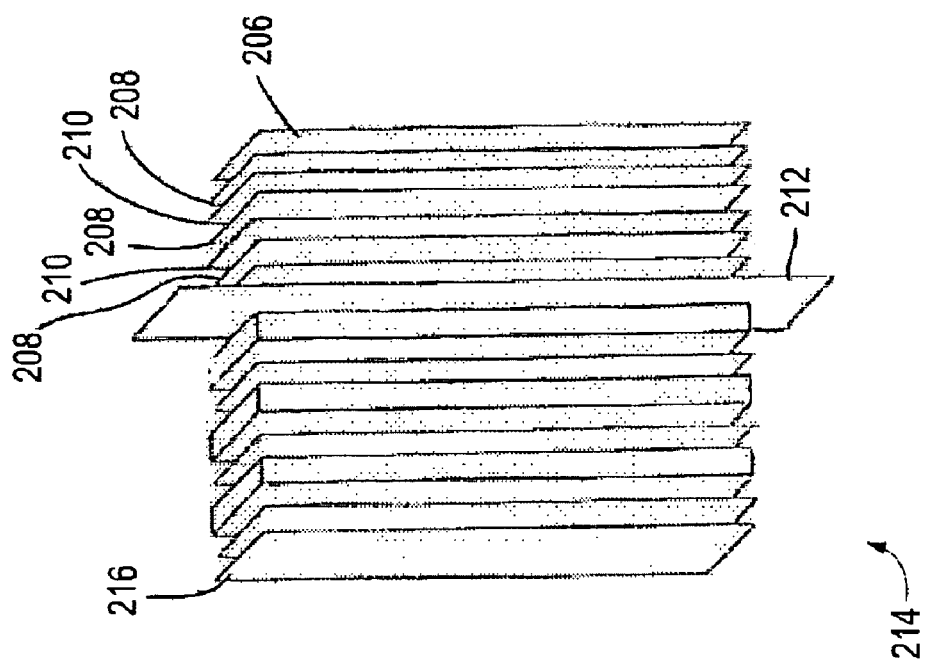
FIG. 4 is an exploded view of a plurality of layers comprising the inflatable shell.

The present invention relates generally to a vessel or module such as the inflatable laboratory module 10 depicted in FIGS. 1-2, and previously described in U.S. Pat. Nos. 6,231,010 and 6,547,189. It is intended that the Description provided in these patents will facilitate the explanation of and highlight the present invention's contribution to the art. Each of U.S. Pat. Nos. 6,231,010 and 6,547,189, including all descriptions and drawings, is, therefore, hereby incorporated herein by reference (for all purposes) and made a part of the present disclosure. Such a module 10 generally includes a structural core 100 having a longitudinal axis 101, an inflatable shell 200, disposed about the core 100, and a launch restraint 400 disposed about the shell 200 (see e.g., FIG. 2). The present invention relates particularly to a load bearing layer of the inflatable shell 200, and, more particularly, to the design, assembly, and manufacture of the load bearing layer.

The module 10 provides a large volume when deployed, but is lightweight, and compact prior to deployment. The vessel or module 10 is useful for many purposes, and is particularly suited for long duration space flight. Such possible uses for the module 10 include, but are not limited to, a habitation element of an interplanetary vehicle that transports humans between planetary destinations, a habitation or laboratory module on the International Space Station and the like, and a laboratory or habitation module predeployed to a planetary or lunar surface.

It should be understood that various aspects of the inventive system and method are contemplated to be suitable for and equally applicable to the design, assembly, manufacture and/or structure of other structural vessels. The design, assembly, and manufacture of an inflatable load bearing layer according to the invention may be applied, for example, to such vessels as hyperbaric chambers, inflatable airlocks, offshore platform ballasts, and the like. In any event, the specific description provided below, which pertains to an inflatable, habitation or laboratory module for space flight is exemplary and should not be construed to limit the invention. Such a specific description is further intended to show and highlight the invention's contribution to the art, as well as a best or preferred mode of practicing the invention.

The module 10 has two basic configurations: a launch or uninflated configuration (as shown in FIG. 2) and a deployed or inflated configuration (as partially shown in FIG. 1). In the launch configuration shown in FIG. 2, the thickness or interior of the inflatable shell 200 may be collapsed by vacuum or the like, and the inflatable shell 200 is deflated, collapsed, and efficiently folded around the structural core 100. The launch restraint 400 maintains the inflatable shell 200 in its collapsed and folded arrangement around the structural core 100. Both the deflated inflatable shell 200 and the structural core 100 are stored within the payload bay of an appropriate launch vehicle, such as the Space Shuttle. In the embodiment that includes a carrier, module 10 is stored within the carrier and the carrier is stored within the payload bay. (See also U.S. Pat. Nos. 6,231,010 and 6,547,189 for further description).

The launch vehicle is used to transport the module 10 in its launch configuration from the earth's surface. Upon release of deployment cords (not shown), the inflatable shell 200 automatically expands and regains its full thickness, and the inflatable shell 200 is inflated to its full volume and surrounds the structural core 100. In the deployed configuration as shown in FIG. 1, the volume of the module 10 is substantially larger than that of the entire Space Shuttle payload bay.

Further description of the structural core 100 and its components may be obtained from U.S. Pat. No. 6,547,189. Such description has been incorporated herein. The focus of the present Description is directed to the inflatable shell 200, the plurality of layers comprising the shell 200 and then, more specifically, a load bearing layer referred to as a structural restraint or restraint layer.

Figure 3:
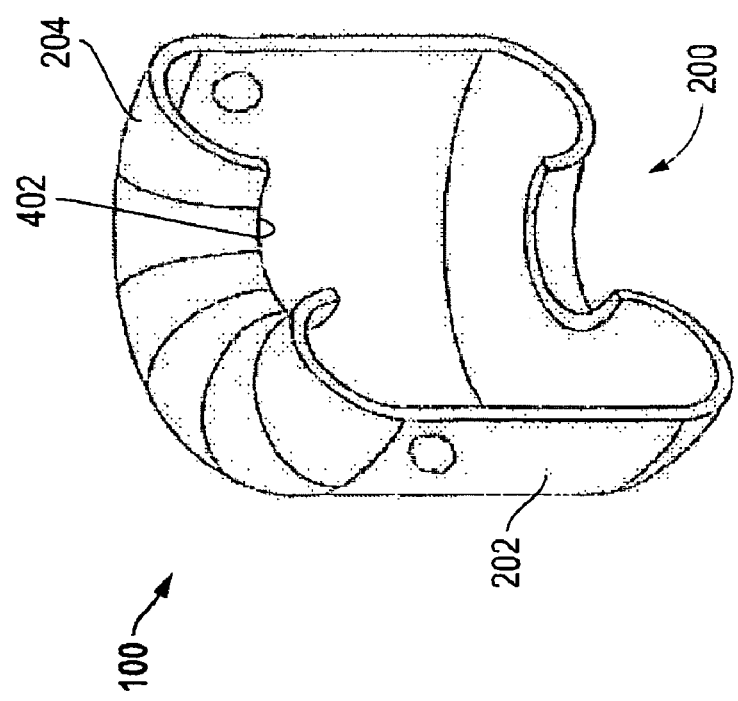
FIG. 3 is an isometric view of half of an inflatable shell of the inflatable vessel.

FIG. 3 provides an isolated, partial view of the shell 200. The shell 200 is preferably a multi-layer construction of soft goods that can be folded around the structural core 100 for efficient packaging in the launch configuration (see FIG. 2) and then inflated into the deployed configuration (see FIG. 1). In the launch configuration, launch restraints 400 maintain the inflatable shell 200 in the collapsed and folded arrangement around the structural core 100 or fairing 134. Once fully inflated into the deployed configuration, the inflatable shell 200 takes a predetermined shape or geometric configuration. In the embodiment of FIGS. 1 and 2, the shape of the inflatable shell 200 includes a circular cylinder 202 with semi-toroidal ends 204. Referring to FIG. 1, the semi-toroidal ends 204 may be maintained in their proper shape by the cloth pattern geometry and by the tension provided by multiple longerons 102. The design and function of the longerons 102 are described in more detail in the Detailed Description of the '189 patent.

As shown in FIG. 3, the exemplary inflatable shell 200 generally includes the following layers: an inner liner 206, a plurality of alternating layers or bladders 208 and bleeder cloths 210, a structural restraint or restraint layer 212, a meteoroid orbital debris (M/OD) shield assembly 214, and an outer liner 216. Further, the inflatable shell 200 includes a plurality of shape rings 218 that are positioned interior to inner liner 206 and secured in place once the inflatable shell 200 is disposed in the inflated or deployed configuration.

Inner liner 206 corresponds to the "inside" wall of inflatable shell 200. This layer 206 provides damage protection to the plurality of bladders 208 in the event that accidents occur within the module 10. Preferably, inner liner 206 is nonflammable, thereby restricting any fire to the interior of module 10.

The plurality of bladders 208 provide a redundant primary gas containment mechanism for the inflatable shell 200. The bladders 208 are sealed together to create a thicker single bladder 211 just before approaching the inner circumference 402 of the semi-toroidal ends 204. A flexible boot (not shown) provides a smooth transition between the redundant bladders 208 and the restraint layer 212 just before the location where the redundant bladders 208 are sealed together. In the preferred embodiment, each of the bladders 208 is designed to be geometrically slightly larger in size than the restraint layer 212.

Restraint layer 212 is preferably constructed from a high performance "soft goods" material that exhibits high strength and stiffness characteristics. Restraint layer 212 provides the primary load bearing structure of inflatable shell 200. Restraint layer 212 also serves to separate the inner layers (inner liner 206, bladders 208, and bleeder cloths 210) from the outer layers (M/OD shield assembly 214 and outer liner 216) of the inflatable shell 200.

Figure 5:
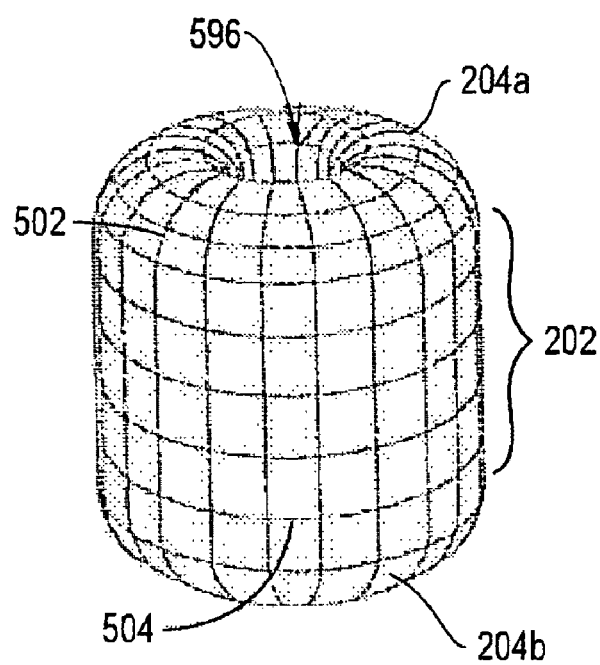
FIG. 5 is a simplified view of a structural restraint layer of the inflatable shell, illustrating indexing longitudinal straps and indexing hoop straps.

The design of the restraint layer 212 is a critical consideration in designing and building an inflatable pressure vessel, such as module 10, that is capable of withstanding high loading. During and after inflation, the restraint layer 212 is placed under tension and maintains the desired shape (geometric configuration) of the inflatable shell 200 and module 10. FIG. 5 provides a simplified view of the restraint layer 212, exclusive of the other layers of the inflatable shell 200.

As used herein, the term "restraint layer" or "load bearing layer" shall mean any material layer of an inflatable vessel installed to withstand an internally subjected load, such as internal pressure. In the preferred case of inflatable flexible materials, such a layer is maintained in tension as a result of the internal pressure. In the present context, the two terms ("restraint layer" and "load bearing layer") are synonymous.

Figure 6:
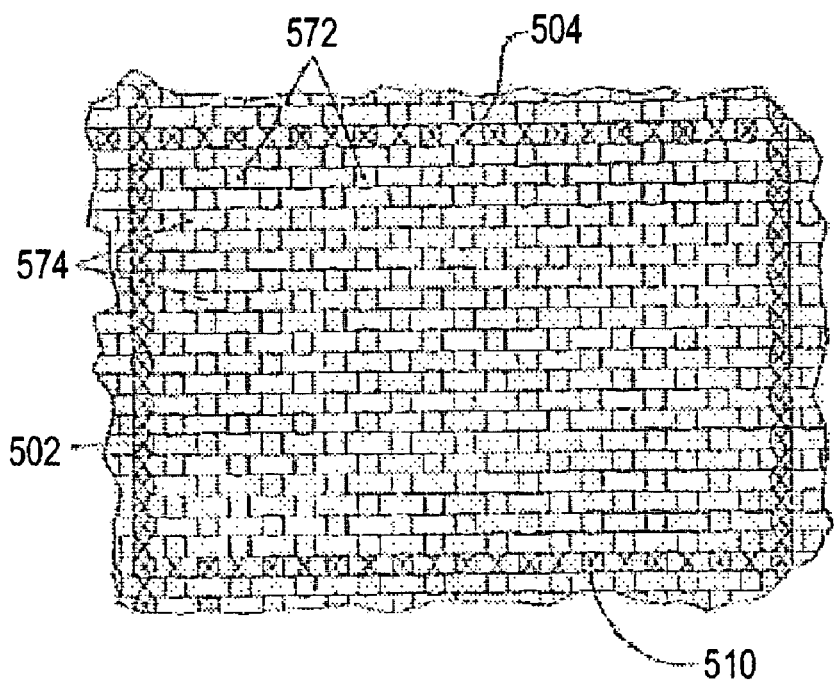
FIG. 6 is a detail view of a portion of the restraint layer in FIG. 5, illustrating a web of straps that are woven and indexed, according to the present invention.

The restraint layer 212 may be fabricated from various high strength flexible materials. Preferably, the restraint layer 212 is constructed of high-strength fabric straps, which may be formed from a Kevlar, Vectran, or PBO narrow webbing material, and the like. The straps form a flexible, web construction consisting of a first set of straps and a second set of transversely extending (relative to the first set) of straps. In the detail of FIG. 6, the webbing includes longitudinally extending (i.e., vertically extending in the Figure) longitudinal straps 572 and circumferentially extending (i.e., horizontally extending) hoop straps 574. In a preferred embodiment, the longitudinal straps 572 and hoop straps 574 form an interwoven, webbing that optimizes the strength and capacity of the restraint layer 212.

As used herein, the terms "assembly", "manufacture", and "fabrication" shall have the same meaning and are, therefore, interchangeable. Each term and its derivatives shall refer to a process of generating a complete restraint layer or inflatable vessel, in accordance with the invention, and more particularly, to the manipulation of the straps of the restraint layer as required to achieve a desired inflated state or geometric configuration of the restraint layer.

Because the webbing (of longitudinal and hoop straps) is assembled with the rest of the layers of the shell 200 during a deflated state, some measures must be taken to ensure that the webbing inflates in a desired, predetermined manner. Preferably, the straps of the webbing inflate together in the desired manner to achieve the target or desired inflated geometric configuration. Further yet, the straps must interact or interface to maintain the desired geometric configuration.

To facilitate achievement and maintenance of a desired geometric configuration, the longitudinal straps and hoops straps are preferably fastened together, prior to inflation at predetermined locations. Specifically, a fastening device is employed to fasten a predetermined location on a longitudinal strap to a corresponding, predetermined location on a hoop strap. These two corresponding strap locations are located at an intersection of a longitudinal strap and a generally transversely extending (i.e., cris-crossing) hoop strap. Such a method of fastening the longitudinal straps and hoop straps in a series or plurality of predetermined intersections is referred to herein as "indexing" and the fastening locations are referred to as "indexing locations" or "index locations".

It is contemplated that such indexing may be accomplished using one of a variety of suitable fastening means, including hand stitching, rope, wire, buttons, rivets, grommets, plastic tabs, glue, other adhesive means, and the like. Furthermore, the longitudinal and hoop straps of the restraint layer may be assembled in other ways, as discussed previously. For example, the desired shape of the module may be achieved partly, through use of fastening techniques including a plain weave, basket weave, sewn, nonwoven intermittent sewing and the like.

For the exemplary restraint layer 212 in the Figures, the fastening or indexing device employed is an indexing stitch 510. Referring to FIGS. 5 and 6, a longitudinal strap that is provided a series of indexing stitches 510, such as longitudinal strap 502, is referred to as an indexing longitudinal strap 502. A hoop strap that is similarly adorned is referred to as an indexing hoop strap 504. The indexing stitches 510 facilitate assembly of the shell 200 in accordance with the present invention. The stitches 510 also help to maintain relative positioning between the longitudinal straps 572 and the hoop straps 574 during inflation and maintenance of the desired geometric shape. Even though the longitudinal straps 572 and hoop straps 574 are preferably interwoven, the webbing has a tendency to kink, wrinkle, slide, or otherwise move about and deviate from the desired configuration. This results from the loads being applied to the straps 572, 574, as well as the relative movement, friction, and dynamics between the straps. The indexing stitches function to maintain the structural pattern of the webbing. The indexing stitches also help to maintain the shape of the shell during packaging and transport of the vessel or during storage.

Each indexing stitch 510 preferably has an x-shaped stitch pattern to secures the hoop strap 574 and the longitudinal strap 572 at the index location. The indexing stitch 510 is preferably designed to withstand a lower yield loading than both the longitudinal straps and the hoop straps. This allows each fastening stitch 510 to breakaway if the webbing is loaded excessively, precluding destruction of the restraint layer straps. In addition, the fastening device 510 may be used around any weave terminating boundaries of the restraint layer, thereby maintaining the restraint layer fabric straps at the boundaries in place.

The restraint layer weave as shown in FIG. 6 is comprised of flexible fabric straps that have a selected and uniform width (although, the width of the hoop straps 574 and the width of the longitudinal straps 572 may be different). The weave formed by the hoop straps 574 and longitudinal straps 572 may be a traditional bi-directional "over and under" or plain weave, or a more complicated weave. This weave pattern when combined with the indexing stitches 510 effectively secures the straps into place so that the straps cannot move out of position, thereby simulating a continuous structure. The weave pattern may be designed to accommodate the geometry of the vessel and equalize the stress distribution among the fabric straps.

The weave design for the restraint layer 212 also permits the use of different strength straps which are tailored to the direction of loading, thereby providing for an optimized structure. The weave design also permits the integration of hard structures, such as windows, at selected locations within the inflatable shell. The woven construction of the restraint layer 212 further permits relatively simple, low cost manufacturing techniques to be used. For example, restraint layer 212 may be assembled without the use of special tools, machines, or fixtures. The straps are simply woven manually into place and then, the indexed locations stitched in place. Also, the woven restraint layer 212 may be easily repaired during the manufacturing process. If a strap has to be replaced, for example, the strap can be easily slipped out and a new strap woven in its place.

Although, the woven construction provides certain structural and assembly advantages, the present invention is not limited to a woven construction. As an alternative to the woven construction, the two sets or types of straps may be positioned as two separate but juxtaposed layers and indexed. Specifically, the inner layer (preferably, the longitudinal straps 572) is placed over (outside of) the next, inner layer of shell 200 (and, thereby about the core 100). The straps may be indexed together at predetermined index locations as described above. Further, the straps 572 may be secured at the top and/or bottom edges to the top and/or bottom of the core 100, so as to affix the webbing. Together, the web of longitudinal straps and web of hoop straps "interface" to provide the restraint layer. In further embodiments, the hoop straps and longitudinal straps may be indexed at various locations and according to various patterns.

As used herein, the term "interface" shall refer to the relative positioning and function of generally transversing (cris-crossing) longitudinal and hoop straps. The interfacing straps may be interwoven or juxtapositioned, indexed or not index, and the like. In any arrangement, the interfacing straps physically contact one another at intersections and support or transfer loads between each other, thereby providing a webbing capable of withstanding an internal pressure or load. Moreover, the interfacing straps of the invention move in a predetermined manner during inflation.

As introduced above, the straps that make up the webbing are referred to as longitudinal straps and hoops straps that are generally transverse to the longitudinal straps. The "longitudinal" or "hoop" terms should be broadly construed, however, particularly because the vessel need not have a rigid core defining the longitudinal axis of the vessel. When the weave is connected to a shell pass-through, any strap may be considered a longitudinal strap, while the generally perpendicular strap may be considered a hoop strap.

The shape or geometrical configuration of the exemplary restraint layer 212 in the Figures has three distinct regions or sections. A middle region 202 is cylindrical and provides a substantial portion of the surface area of the restraint layer 212. The top and bottom regions of the restraint layer 212 are provided by an upper toroid region 204*a* and a lower toroid region 204*b*, respectively. Alternative configurations may provide a spherical region in lieu of a toroid region. Each toroid region 204 has an interior circular rim that forms an inner circle 596 ("donut") and attaches to the core 100. In this way, the restraint layer 212 is secured to the core 100 and to the rest of the module 10. A clevis roller device may be provided about the rim as support for the longitudinal straps, as further described below.

The webbing of the restraint layer 212 is preferably woven such that the gap in the inflated configuration ("design gap") between adjacent longitudinal straps or between adjacent hoop straps is small. Typically, the design gap between adjacent straps (in the inflated state) varies from 0" to as high as about 4-6". The design gap is kept small even though the largest diameter of the inflated shell may be twice the diameter of the shell where it is attached to the solid core. This may be accomplished by creating a single loop out of every two adjacent longitudinal straps. Each longitudinal loop transitions from a single strap thickness at the larger diameter to a double strap thickness at each end of the loop where the strap passes around a clevis roller. The clevis devices function to support the longitudinal straps on the central structural core.

The module 10 provides a highly loaded, inflatable pressure vessel that integrates a flexible shell with a rigid core. The efficient restraint layer provides for a lighter overall shell weight, and the woven design permits tailoring of the structure to optimize the weight. By looping longitudinal straps around clevis rollers, loads may be distributed between pairs of adjacent longitudinal straps. The restraint layer design also permits the integration of a hard structure pass through, such as a window, to the inflatable shell.

Figure 7:
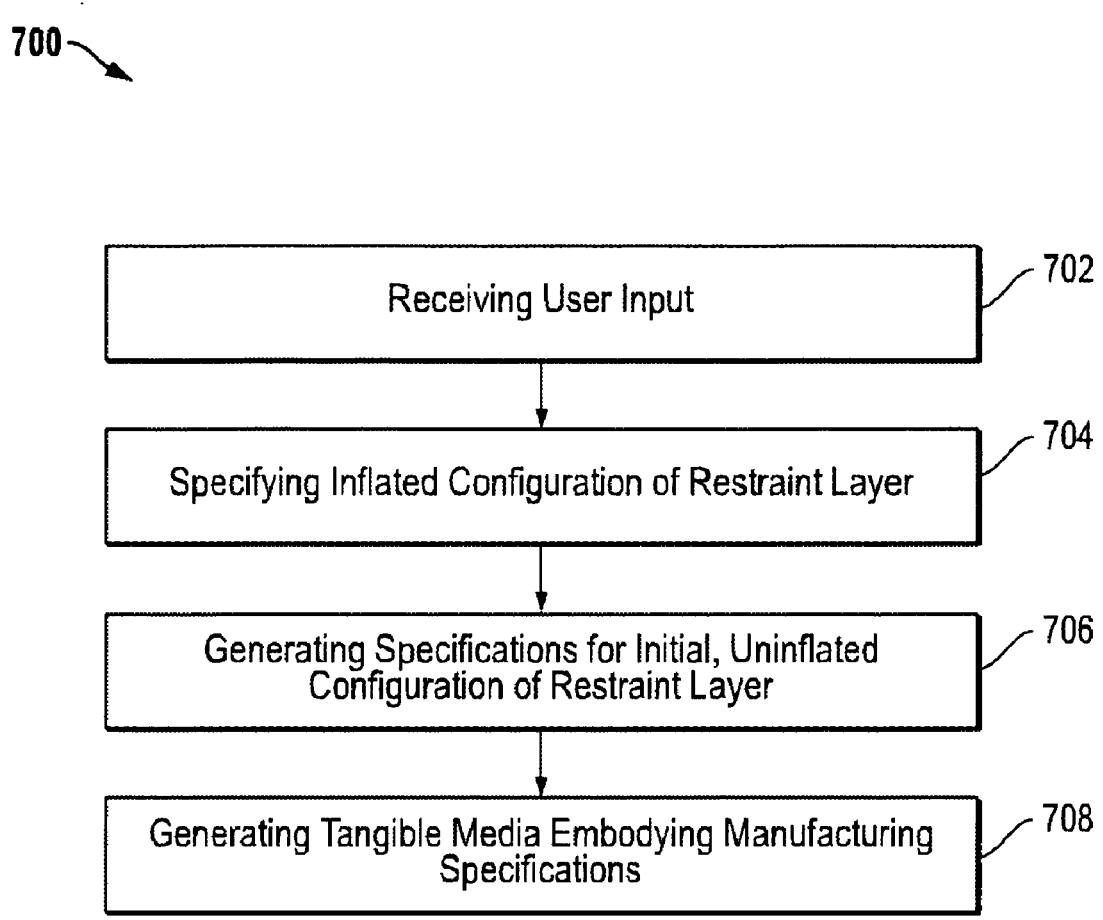
FIG. 7 is a simplified representation of a method of designing a restraint layer of an inflatable vessel, according to the present invention.
Figure 8:
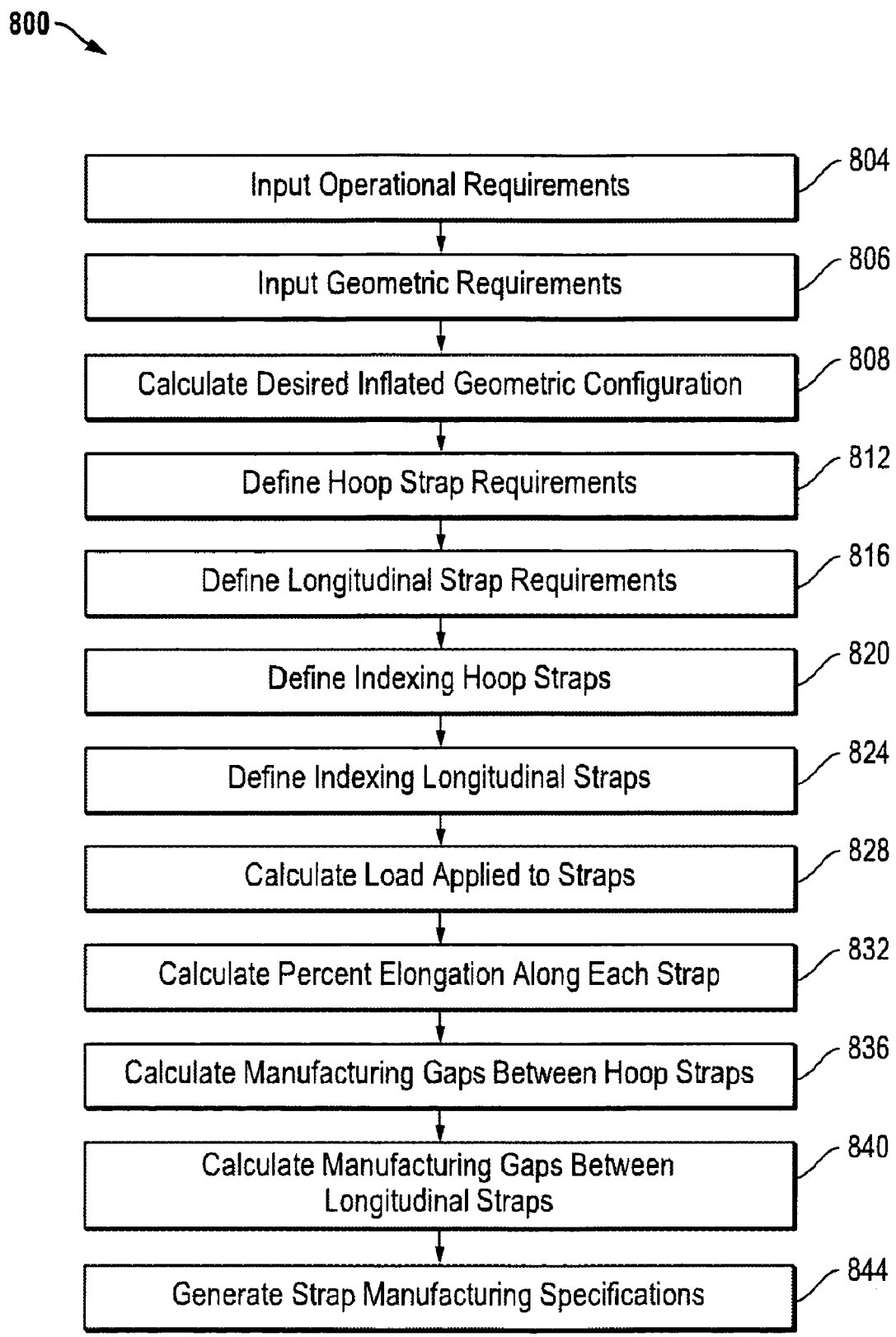
FIG. 8 is a simplified flow chart of the method of designing a restraint layer of an inflatable vessel, according to the present invention.

FIG. 7 is a simplified illustration of various stages in a method of designing a restraint layer according to the present invention. FIG. 8 provides a simplified flow chart accounting, in more detail, the steps of a preferred method of designing an exemplary restraint layer. The method may be described, in one respect, as a computer-implemented method of designing or manufacturing an inflatable restraint layer such as the restraint layer 212 described above. Practice of the inventive method provides, among other things, complete specifications for the inflated restraint layer in the inflated geometric configuration including dimensions, positions, and indexing locations.

The method also provides complete manufacturing specifications for the restraint layer in the initial, uninflated geometric configuration. The initial, uninflated configuration is the geometric configuration that is inflatable to achieve the specified, inflated configuration. In one embodiment, the initial, uninflated configuration is a provided by webbing of interfacing longitudinal and hoop straps that are spaced apart (or overlapping) according to predetermined specifications. Preferably, the inventive method is practiced in combination with the utilization of generally known computer processing means such as standard computing hardware with a micro-processing unit and software and programs installed therein. Steps of the method may be implemented by way of programs programmed under any one of a number of computer formats. In a variety embodiments, the system will utilize programs under MathCad, C++, Excel, and/or others. In a further aspect of the invention, the method may be described as a method of generating specifications for manufacture of the specified restraint layer. In yet a further aspect of the invention, these parameters are embodied in one or more practical tools, including manufacturing drawings, procedures, tables, and assembly templates and other tangible media.

Referring first to FIG. 7, the first stage 702 of the method generally entails receiving user inputs. This stage 702 includes selecting the desired inflated geometric configuration of the module or vessel, the webbing or strap sizes, and relative positions or spacing of the straps. User inputs further include operational requirements of the restraint layer, including pressure requirements within the vessel, desired safety factors, and certain material properties of the straps (through selection strap types).

By utilizing known computer processing means (and preferably, MathCad software), a second stage 704 is implemented to specify the inflated geometric configuration of the restraint layer. Specifically, the user inputs are processed in a first set of computations to determine the detailed geometric configuration of the restraint layer at inflation. As will become apparent below, this specified inflated configuration becomes a target for later stages of the method.

Figures 9, 9A:
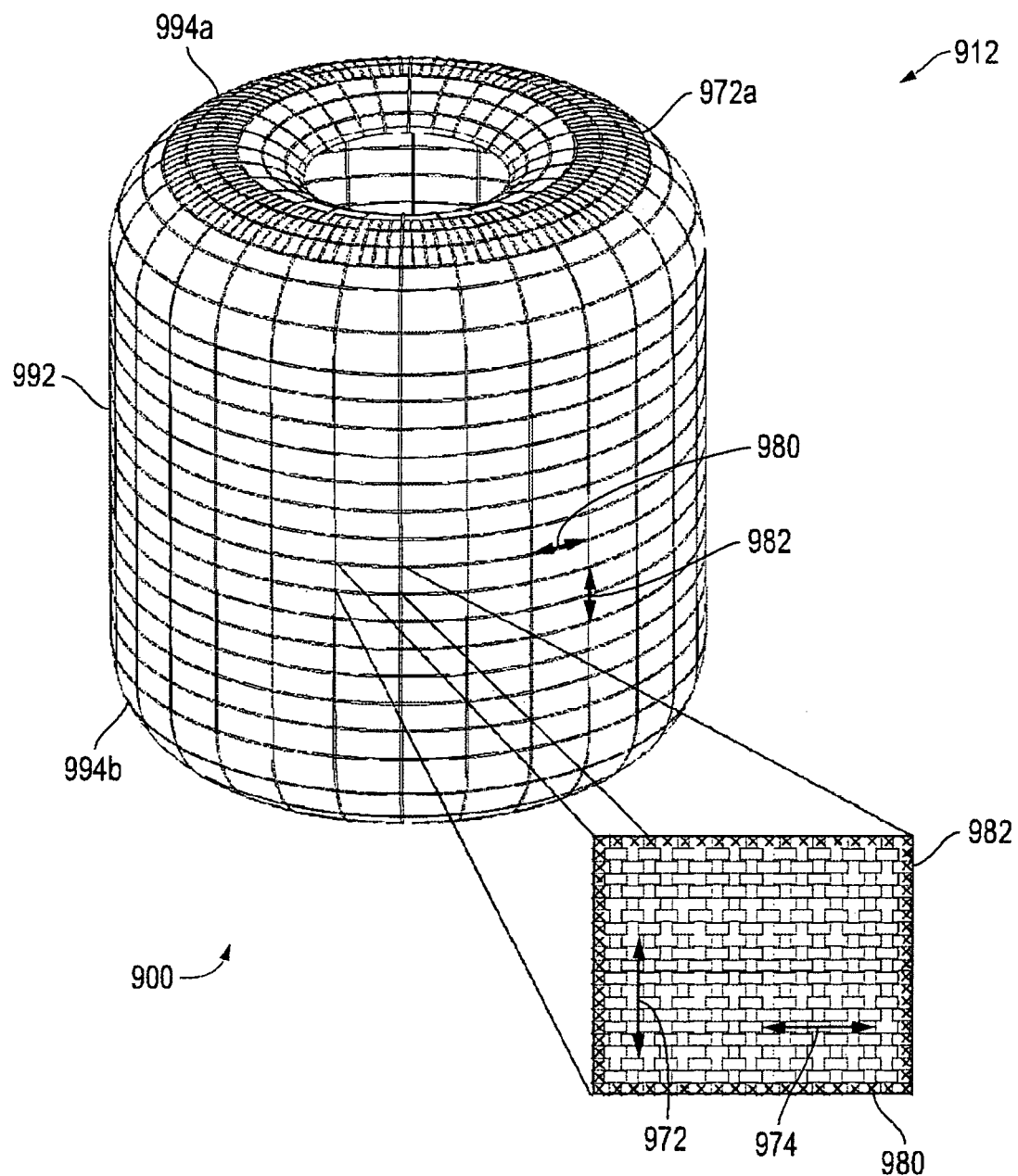
FIG. 9 is an illustration of an exemplary inflated geometric configuration of an inflatable vessel having a cylindrical region and toroid regions.
FIG. 9A is a detail of a section of the inflated restraint layer in FIG. 9.

FIG. 9 provides an illustration 900 of a restraint layer 912 designed according to the method. The illustration 900 represents, in one respect, a product of the method illustrated by FIGS. 7 and 8. The illustration 900 provides an account of every longitudinal strap 972 and every hoop strap 974 required by the restraint layer 912. The illustrated restraint layer 912 has a geometric configuration in the inflated state that provides an upper toroid region 994a, a middle cylinder region 992, and a lower toroid region 994b. The illustration 900 also provides the indexing hoop straps 980. These hoop straps 980 are identified as those hoop straps that are indexed to a transversely extending longitudinal strap 972 at every intersection therewith. Similarly, the illustration provides every indexing longitudinal strap 982. The indexing longitudinal strap 982 are those longitudinal straps that are indexed to a transversely extending hoop strap at every intersection therewith. Hoop straps and longitudinal straps that are indexed only at intersections with an indexing longitudinal or hoop straps are referred to as standard hoop straps or standard longitudinal straps.

The illustration of FIG. 9 also provides every secondary indexing longitudinals 972a. These longitudinal straps are those straps which are indexed at user-defined intersections with a hoop strap. In this particular exemplary design, the secondary indexing longitudinals 972a appear in the toroid regions 994a, 994b, wherein the shape or contour of the restraint layer 912 deviates from that in the middle cylinder sections 992. As expected, the straps 972, 974 in the toroid regions 994a, 994b are subjected to different loads than those in the cylinder region 992.

FIG. 12 provides a detailed section of the restraint layer 912 in the inflated configuration. In the target, inflated configuration, the webbing of the restraint layer 912 is provided by a first set of straps or longitudinal straps 972 and a second set of straps or hoops straps 974. The second set of straps 974 extends generally transversely in respect to the first set of straps 972, thereby intersection or crisscrossing the first straps 972. Two transversely related straps 972, 974 form intersections 996 which, for some straps, provide an indexing location 998. In the detail of FIG. 12, one of the longitudinal straps 972 is an indexing longitudinal strap 972a.

In the inflated configuration, adjacent hoop straps, (such as the two depicted in FIG. 12) are positioned at a spacing or design gap XX. Similarly, adjacent longitudinal straps (such as the two straps 972 depicted in FIG. 12) are spaced apart by a design gap YY. Furthermore, the index locations 998 are separated by a distance or index gap ZZ. Referring to the illustration of FIG. 12, the index gap ZZ along the longitudinal strap 972a, is equal to the design gap XX plus a width, W, of a longitudinal strap 974.

In a subsequent stage 706, a second set of computations is implemented to determine a detailed configuration of the restraint layer 912' in the initial, uninflated configuration or state. This initial, uninflated configuration provides the specifications that will achieve the target inflated configuration. This process involves calculating the loads applied to the straps of the restraint layer, calculating the percent elongation experienced by each strap during inflation, and finally, calculating the spacing (or manufacturing gaps) between adjacent longitudinal straps or hoop straps for the initial uninflated configuration. The latter calculation will be based on the percent elongation of the relevant straps and the design gaps that are targeted. The manufacturing gaps calculated are, therefore, referred to herein as the reduced or manufacturing gap (in the initial, uninflated configuration) that "correspond" to the specified or target design gap (in the inflated configuration).

FIG. 12A illustrates the restraint layer 912' in the initial, uninflated configuration, wherein like elements are referred to using like reference numerals. In the initial, uninflated configuration, the spacing or gap between longitudinal straps 972' is referred to as a manufacturing gap YY' and the spacing or gap between hoop straps 974 is referred to as manufacturing gap XX'. As will be further discussed below, the manufacturing gaps XX' and YY' are reduced by the percent elongation in the straps 972, 974, during inflation. In some embodiments, the manufacturing gaps XX', YY' may be a negative number, which indicates that the straps overlap in the initial, uninflated configuration. In this configuration, the index gap ZZ' is also reduced in accordance with the reduction in the manufacturing gap XX'. In one aspect of the present invention, a method of designing the restraint layer 912' determines the manufacturing gaps XX', YY', necessary to achieve the design gaps XX, YY, in the inflated configuration of the restraint layer 912.

This stage 706 of the method may be referred to as the generation of the specifications of the initial, uninflated restraint layer. In this stage 706, the results of the computations include all the relevant specifications of the restraint layer including the cut lengths, width, position or location, and index locations for every longitudinal and hoop strap. The specifications also include the manufacturing gaps XX', YY' between adjacent hoop straps and between adjacent longitudinal straps.

In a subsequent stage 708, the manufacturing specification are collected, compiled, and presented as tangible media, for use in manufacturing and assembly of the restraint layer. For example, output data and information are processed to produce manufacturing drawings, assembly procedures/instructions presented in tables, and assembly templates. The manufacturing specifications are embodied in these tangible media. The collection of these tangible media provide information required to assemble the restraint layer. More particularly, this tangible media provides the information required to specify each strap, cut or shape each strap as necessary, pre-mark each strap prior to webbing assembly, and position the straps of the webbing prior to inflation.

The manufacturing drawings provide an illustration of each strap type, including the dimensions required for each strap type. As further described below, the manufacturing drawings provide a table identifying each of the straps of that strap type, certain properties of each strap, and the dimensions (as specified by the strap type illustration)

applicable to each strap. In accordance with the present inventive method, information required in the table may be generated by operation of a computer program and then cut and pasted onto a table that becomes the table of the manufacturing drawing. Furthermore, the preferred computer implemented method provides one or more templates that may be utilized to mark each of the straps in the manufacturing drawings. Specifically, the templates are used to mark the straps of discrete index locations, as a preliminary procedure for assembly of the webbing. When the straps of the webbing have been marked, the index location of every hoop strap may be matched with corresponding index locations on a transversely extending, interfacing longitudinal strap, thereby providing the initial relative positions of the straps of the webbing. Upon completion of the weaving and the sewing or fastening of the index locations, the resultant uninflated webbing or restraint layer (the initial, uninflated geometric configuration) may be inflated to achieve the target geometrical configuration at design pressure.

Now returning to the flowchart 800 of FIG. 8, the steps of the inventive method can be described in more detail. Again, it should be noted that the method described herein and illustrated in FIG. 8 is for exemplary purposes only. It will be apparent to one skilled in the relevant mechanical, structural, aerospace, materials, and other relevant art, upon a viewing of the drawings and/or a reading of the present description, that various aspects of the invention will be applicable to other manufacturing or assembly methods, and more specifically, to the design and manufacture of other structural vessels.

The flow chart 800 provides a general representation of the preferred steps of the exemplary design method. An initial step 804 of the method requires user input of certain operational requirements. Preferably, the user enters data into fields of a computer executable program. Among the information or data required are design safety factors and internal pressure requirements.

Figure 11:
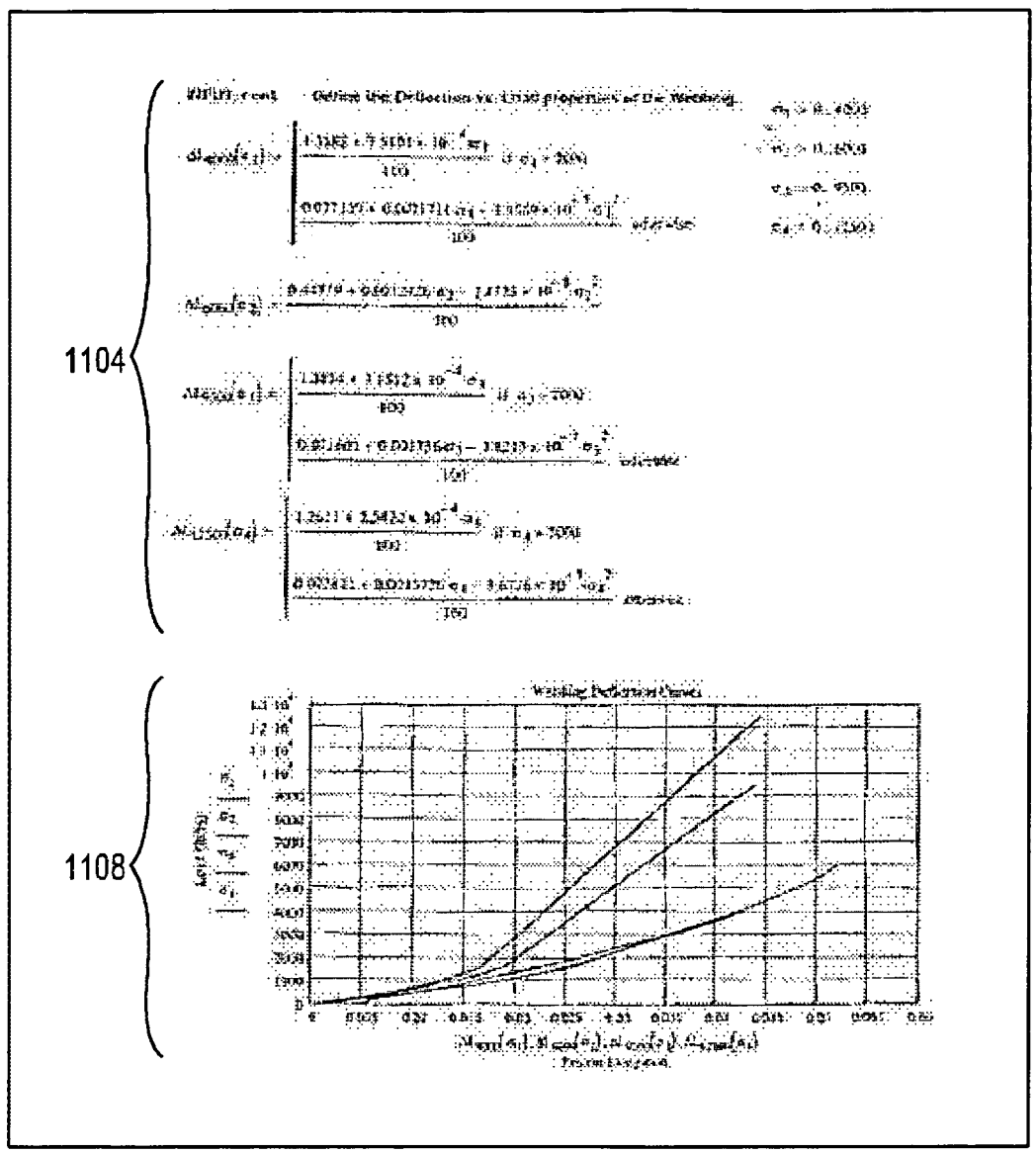
FIG. 11 is an exemplary input screen display.

The user also inputs information regarding the straps with which the restraint layer is to be constructed. This input information includes the strap type, strap thickness, and, the width of the strap. This input typically provides, as well, the strap material properties such as the coefficient of friction, and certain strength and elastic properties, including deflection curves. FIG. 11 depicts a representation of the input of appropriate equations 1114 for stress-strain properties of the webbing. The screen shots also display stress-strain curves 1408 corresponding to the equations for a plurality of strap types. As is generally known in the art, such deflection curves 1108 may be obtained by conducting pull tests. In most applications, the longitudinal straps and the hoop straps are of the same material and general design, but have different strength properties.

Utilizing a suitable computer processing means, the user inputs certain geometric requirements of the vessel (step 806). These requirements pertain to the geometric configuration desired of the vessel upon inflation. In a preferred computer-implemented method, the user specifies or selects one general shape among a list of standard configurations. Preferably, this step is a user-interactive process, whereby the user selects one configuration from a number of options. A typical list of options will include the general configurations 10(a)-10(g) illustrated in FIG. 10.

In a preferred computer-implemented method, the general shape may already be pre-selected. For example, a typical, structurally advantageous structure is the cylindrical geometric configuration depicted in FIG. 9. The restraint layer 912 of this design has a middle, cylindrical region 992 occupied by a generally, symmetrical web of longitudinal straps 972 and hoop straps 974, an upper toroid region 994a, and a lower toroid region 994b. As mentioned previously, this geometric configuration has certain desirable attributes and is particularly suited for a spacecraft application.

Figure 10:
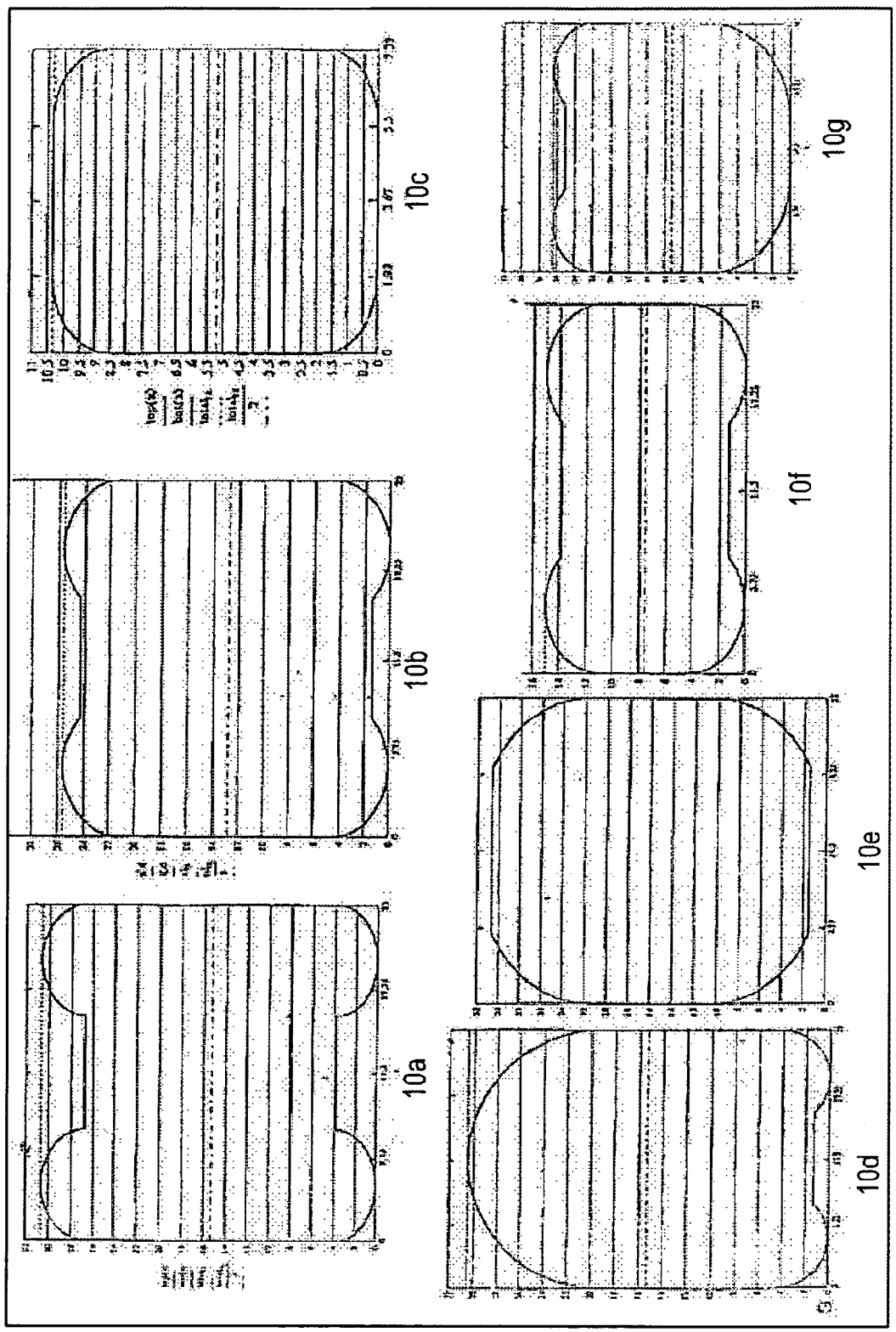
FIG. 10 illustrates various exemplary geometric configurations of a restraint layer designed and assembled, according to the present invention.

After completion of the user input steps 804, 806, the method calculates the geometric characteristics of the restraint layer (step 808) in the inflated configuration. These characteristics include, but are not limited to the geometry of the cross-section of the restraint layer configuration. For example, configuration 10a in FIG. 10 is a screen display of the cross-section of the symmetrical geometric configuration for the restraint layer in FIG. 9. Various dimensions are calculated including the height of the cylinder region, height of the toroid region, and the circumference of the restraint layer at locations along the toroid regions. The arc lengths of the toroid regions are also determined. Furthermore, certain volumes are also calculated including total volume and volumes of the toroid regions and the cylindrical region, as well as the surface area of the restraint layer.

The shape of the inflated restraint layer is defined after these steps. The definition is, however, limited to a blank shell. The webbing of the restraint layer is absent and more specifically, the geometric configuration of hoop straps and longitudinal straps. Subsequent steps of the method are, therefore, focused on defining the strap requirements of the inflated configuration of the restraint layer. For purposes of the present description and to promote clarity, discussion of these steps are divided between those applicable to hoop straps and those applicable to longitudinal straps.

First, the hoop strap requirements of the inflated toroid and cylinder regions are defined (step 812). In respect to the embodiment depicted in FIG. 9, the hoop strap definition for the toroid region and the cylinder region are performed separately. The cross sectional outline of FIG. 9B illustrates the three regions for which hoop straps are defined. The toroid regions 994a, 994b are shaped differently from the cylindrical regions 992, and thus, have different strap requirements. The toroid regions 994a, 994b are also subjected to different loading requirements. Generally, this definition step is an interactive process requiring the user to vary strap width and a desired target gap between the adjacent hoop straps (in the inflated configuration). In the computer-implemented method, the program calculates the number of hoop straps having the selected width and design gap that "fit" the subject region and displays the result to the user. If satisfactory, the total number of toroid hoop straps, the width of each toroid hoop strap, and the position (location) of each toroid hoop strap are accounted for.

The number of hoop straps 974 in the cylinder regions 992 is also determined based on the width of the hoop straps 974 and the target design gap YY between adjacent hoop straps 974. In the computer-implemented method, the program outputs the number of hoop straps that fit in the cylinder region based on these inputs. Typically, the width and the design gap YY will be varied until a whole number of hoop straps satisfies the specified height, hc, of the cylinder region.

Similarly, the longitudinal straps of the cylindrical region and toroid regions are defined (step 816). The user inputs the quantity of longitudinal straps contemplated. The user also specifies whether the longitudinal straps are sewn together in pairs (which, decreases the distance between the longitudinal straps in half). Preferably, the process of defining the longitudinal straps is, at least partly, a user interactive one, whereby the user varies the desired quantity of longitudinal straps to arrive at a desired gap width or design gap (or vice-versa).

The result of steps 812, 816 provides a complete accounting of all the hoop straps and all the longitudinal straps of the inflated restraint layer. This accounting includes the locations or relative position of each strap and the design gap between adjacent straps. At this point, the shell of the restraint layer is filled with the required configuration of hoop and longitudinal straps.

In yet another step 820, the method defines the indexing hoop straps of the restraint layer. This step 820 may entail the user specifying a quantity of hoop straps desired between indexing hoop straps or a distance between the indexing hoop straps. Again, the user varies the quantity or distance until a whole number of spaced apart indexing hoop straps is provided. Similarly, in a subsequent step 824, the method specifies or defines the indexing longitudinal straps of the restraint layer. This entails the user specifying the number of longitudinal straps desired between indexing longitudinal straps or the spacing between indexing longitudinal straps. Once again, the user may vary the number and spacing until a whole number of longitudinal straps are fit into the target region.

With the indexing straps identified, the index locations are also identified, as are the distances or index gap between index locations. As discussed previously in regard to FIG. 12, this index gap is a center-to-center dimension. In regard to an indexing longitudinal strap 972$a$, for example, the index gap, ZZ, is measured from the center of a first intersection 998 between a first longitudinal strap 974 and a transverse hoop strap 974 to the center of a second intersection 998 between the next or adjacent hoop strap 974 and the same transverse longitudinal strap 972$a$. This indexing gap ZZ is equal to the width, W, of the hoop strap 974 plus the design gap XX between the hoop straps 974.

With the above information, the configuration desired of the webbing of the restraint layer in the inflated state is generated and a depiction such as the illustration 900 of FIG. 9 may be displayed. This inflated configuration includes the strength of the straps and the relative positions and dimensions of all the longitudinal and hoop straps. Furthermore, a summary of all the longitudinal straps and hoop straps may be generated. This summary would identify all standard hoop straps, indexing hoop straps, and whether-hoop straps are in the cylinder region, upper toroid region, or lower toroid region. The summary would similarly identify all of the longitudinal straps, including the style and locations. Generating a depiction and straps summary for the restraint layer is therefore tantamount to generating a "blueprint" of the inflated restraint layer. At this point, complete specifications for the target inflated configuration of the restraint layer is provided. Specifying an initial configuration for the restraint layer in the initial, uninflated state that, when inflated, achieves this target configuration now becomes the objective of subsequent steps of the inventive method.

Given the position of every strap in the restraint layer and the internal pressure requirement, the loads may be calculated and determined for every portion of every hoop strap and of every longitudinal strap (step 828). The load may vary from one location to the next on the straps. Preferably, this calculation is made through employment of computer processing means that also displays the results to the user. Among the loads that are calculated are: strap tension; efficiency of straps due to complex curvature of the vessel; shear force required to prevent the hoop straps from sliding in the toroid region; margins of safety; and others.

Given the applied loads at every relevant location, the percent elongation of every hoop strap and longitudinal strap (at every location along the strap) may be calculated when that strap is pressurized (i.e., its condition in the inflated configuration) (step 832). Specifically, this provides the amount of stretch in the lengthwise direction of the strap. Preferably, this step is performed using the deflection curves 1108 inputted by the user (as illustrated by FIG. 11).

In the next step 836, the manufacturing gaps between every adjacent hoop straps are calculated. Referring again to FIG. 12A, the manufacturing gaps XX' are the edge-to-edge distance between adjacent hoop straps 974' of the initial, uninflated configuration. The design gap XX is the distance between adjacent hoop straps 974 in the inflated configuration. In this step, the method determines what manufacturing gap is required between adjacent hoop straps 974, prior to inflation and prior to elongation of the longitudinal straps 972 interfacing with the adjacent hoop straps 974, to achieve the corresponding design gap XX. In one respect, this is a reverse process that may also be referred to as determining the under-sizing requirements of the hoop straps. The target design gaps XX between adjacent hoop straps 974 (which are specified by the user) are reduced or undersized by the percent elongation that is calculated for the transversely extending longitudinal straps 972 that interface the adjacent hoop straps 974. This results in the reduced gap or manufacturing gap XX' required between the hoop straps 974 prior to inflation.

Similarly, the inventive method implements the step 840 of calculating the manufacturing gaps YY' between adjacent longitudinal straps 972 (as shown in FIG. 12A). As before, this sub-process relies, in part, on the user-defined design gap YY between adjacent longitudinal straps 972 and the percent elongation experienced by the hoop straps 974 that interface the subject adjacent longitudinal straps 972 (see FIG. 12).

It should also be noted that the cut lengths of each of the hoop straps and longitudinal straps may be obtained from the percent elongation calculation. Basically, the required length of the straps in the inflated state is reduced or undersized by the percent elongation calculated.

The manufacturing gaps obtained above (steps 836, 840) are later used to mark the index locations 998 of the straps 972, 974 prior to assembly of the webbing of the restraint layer 912 (see FIGS. 12 and 12A). The distance between index locations (indexing gaps ZZ) for an indexing longitudinal strap 972 corresponds to the center-to-center distance between hoop straps 974 interfacing with that index longitudinal strap 972. This distance ZZ is the same as the distance between the centers of two intersections 998. The center-to-center distance ZZ', as determined prior to inflation, is equal to the manufacturing gap XX' between the hoop straps 974 plus the width of the hoop strap, W. As for the non-indexing hoop or longitudinal straps, the distance between index locations may be determined, before inflation, by adding the appropriate manufacturing gaps and the strap widths between the two index locations.

It should be noted that, in some applications, including the exemplary one provided herein, further definitions of the hoop straps and longitudinal straps in certain regions of the restraint layer may be provided. For example, the user also inputs the number of hoop straps between indexing hoop straps in the toroid regions of the exemplary embodiment. The user also inputs the number of additional or secondary indexing longitudinal straps in the toroid regions, as required by the specific loading and geometry of the region.

Furthermore, the preferred computer-implemented method generates the information required to fabricate the hoop straps and the longitudinal straps for the initial, uninflated configuration, according to the present invention. The method also presents the information in a practical, tangible form (step 844). This information (hereinafter referred to as "manufacturing specifications") includes data required for manufacturing drawings, data required for indexing marking procedures, and data required for assembly templates which are used to implement the indexing marking procedures. Generally, manufacturing specifications are generated and presented for each strap type: standard longitudinal; primary indexing longitudinal; secondary indexing longitudinal; standard hoop; and indexing hoop strap. To illustrate further aspects of the invention, a subprocess of presenting, this output of information for a particular strap type and utilizing this output will be discussed in further detail in respect to a standard hoop strap.

Figure 13:
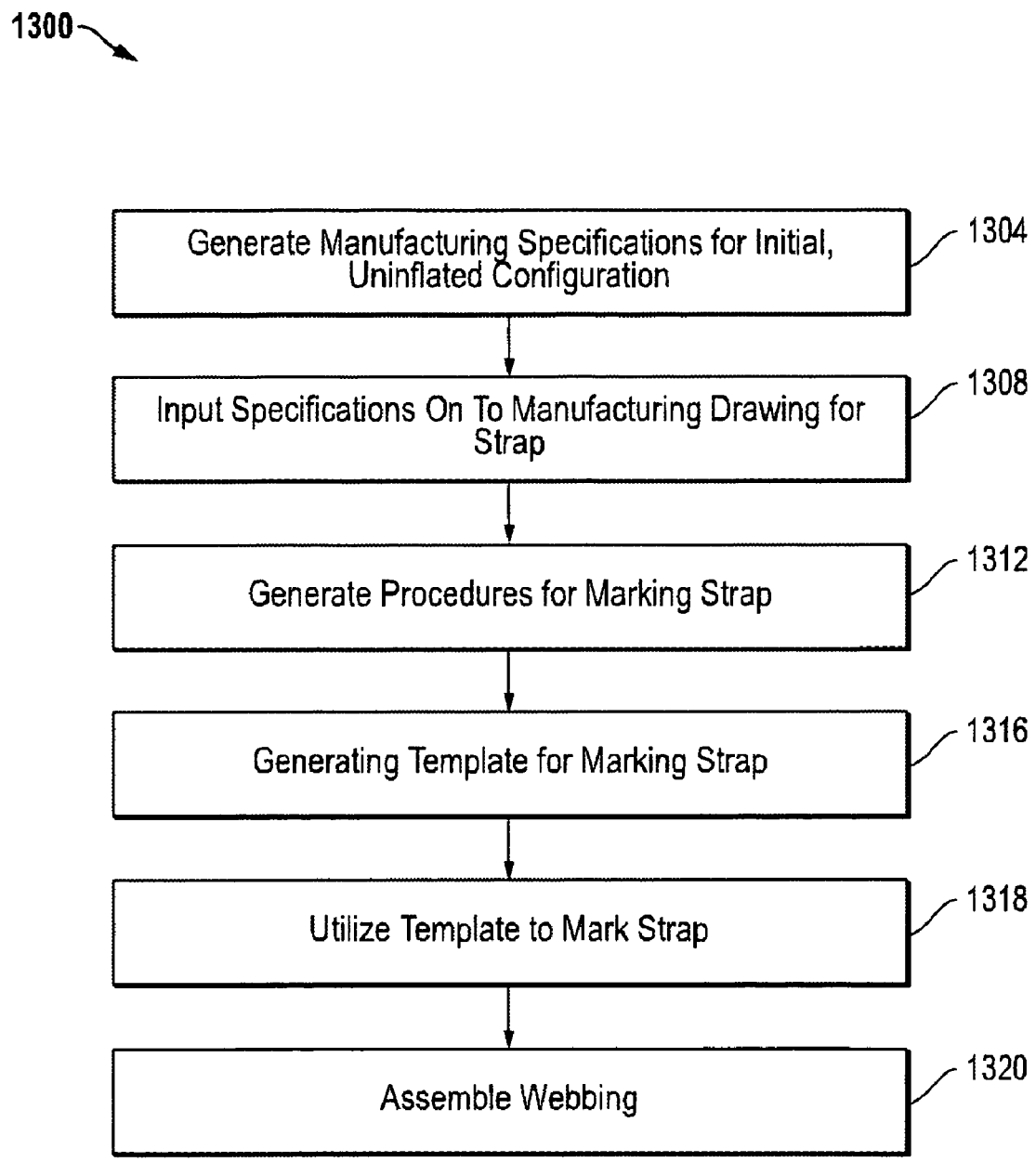
FIG. 13 is a simplified flowchart for a subprocess of assembling a restraint layer, according to the present invention.
Figures 14, 16:
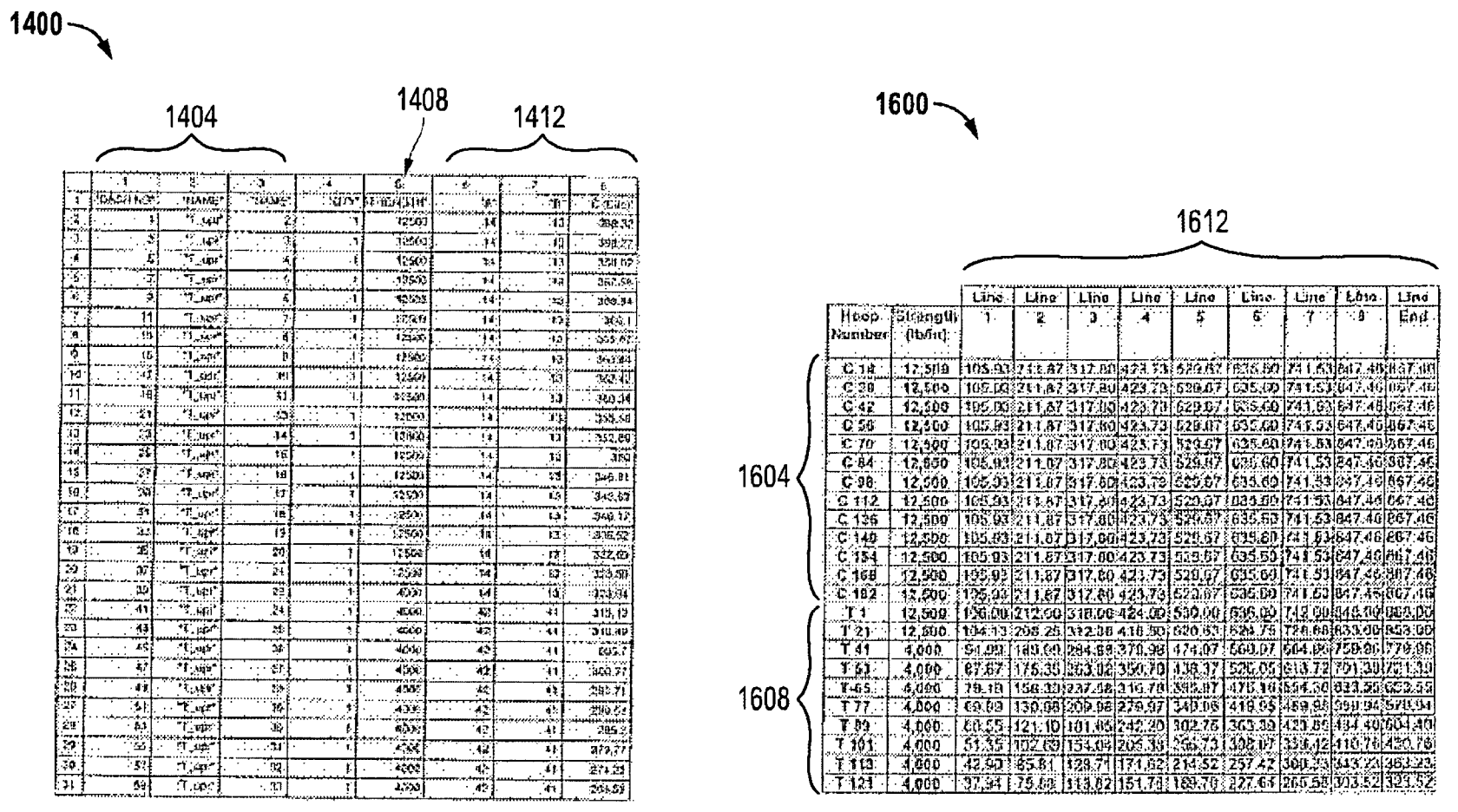
Figure 15:
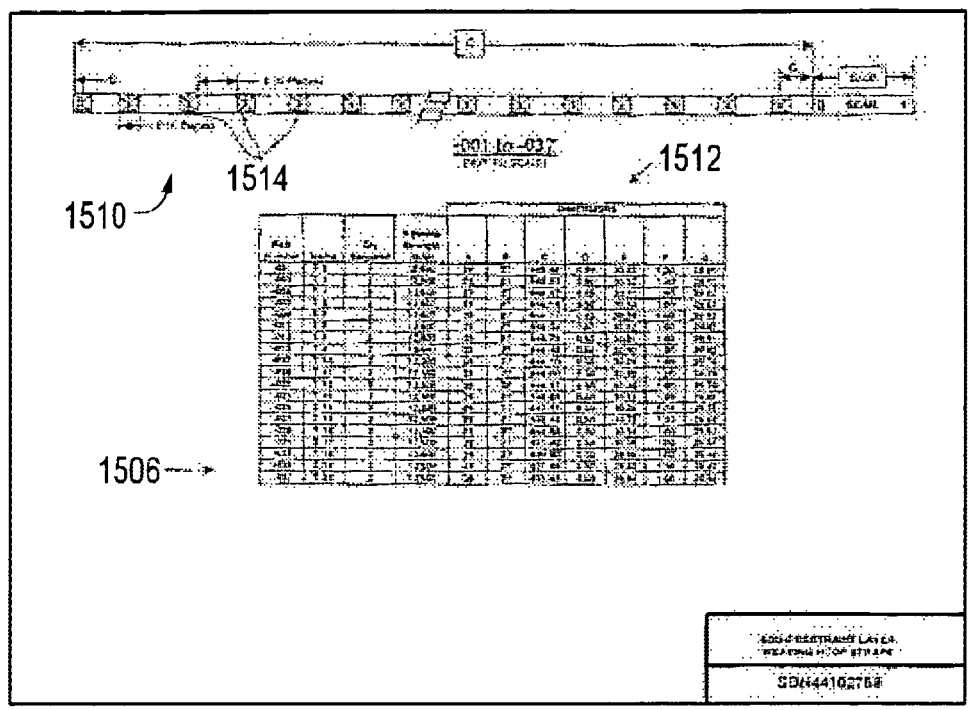
FIG. 15 is a representative manufacturing drawing sheet for straps of one strap type, according to the present invention.

FIG. 13 is a simplified flowchart of a subprocess of assembling an initial, uninflated configuration of the restraint layer, as discussed above. In combination with the method discussed in respect to FIG. 8, the two processes describe a generalized method of designing and assembling a restraint layer, according to the present invention. In the first step 1304 of the subprocess, the manufacturing specifications of the straps are generated as output as described above. Some of the data in the Tables of FIGS. 14-16 are representative of the manufacturing data generated. This data also includes such specifications as the quantity of a particular strap type required, unique identifiers for each strap, types and relative positions of the straps (e.g., as may be evident in the sequence of listed straps listed), and indexing gaps and/or locations of the restraint layer in the initial, uninflated configuration are provided as output.

The preferred computer-implemented method further generates standard hoop strap manufacturing specifications in tabulated form as shown, for example, in the truncated Table in FIG. 14 (step 1304). The manufacturing specifications provide for each strap designation (e.g., standard hoop strap or primary indexing hoop strap), strap identifiers 1404 including the region where the strap is located (upper toroid, lower toroid, or cylinder), its material strength 1408, and certain manufacturing dimension specifications (e.g. "A", "B", and "C"). These specifications include the length or circumference required of the standard hoop strap. The listing or sequent 1414 is also indicative of the relative positions of the hoop straps. Further, as described in more detail below, these manufacturing dimension specifications also provide dimensions and specifications pertaining to manufacturing gaps and index gaps, and, thus, provide the protocol for pre-marking the standard hoop strap during assembly. The pre-marks indicate the intended index locations on the hoop strap (for indexing to corresponding index locations on the longitudinal straps).

The manufacturing data is then inputted onto tangible media, including manufacturing drawings (step 1308). From the Table on FIG. 14, the manufacturing data may be inputted directly (e.g., cut and pasted) onto a standard hoop strap manufacturing drawing sheet 1500, a representative drawing of which is shown in FIG. 15. The manufacturing drawing includes a manufacturing table 1506 that identifies every strap of a particular type of strap (e.g., all the standard hoop straps in toroid regions) and a unique set of manufacturing specifications for that strap. The manufacturing drawing 1500 further provides a representative illustration 1510 of the strap type (e.g., a standard hoop strap) that depicts each of the relative manufacturing dimension variable (e.g., A-G) and index locations 1514. The strap representative illustration 1510 is applicable to every strap in the Table 1506. The Table 1506 provides, for every strap, the required value for each manufacturing dimension variable 1512 (as represented in the illustration 1506) for that strap, including the overall cut length of the strap, the width, and the distance between every index location (index gap).

In another step 1312, procedures are generated for marking each of the standard hoop straps in the manufacturing table 1506. These procedures refer to each strap and to specific templates generated by the inventive method to mark each of the straps in the manufacturing drawings. The marking procedures include a Table 1600, as illustrated in FIG. 16, that identifies each strap of the cylinder regions (1604) and of the toroid regions (1608), and the initial marking locations 1612 (i.e., distance from an end of the strap) for the strap. After the initial marking locations are measured and marked on the strap, the appropriate template is applied to the strap. The initial markings are used to align the template as required for the proper marking.

Figure 17:
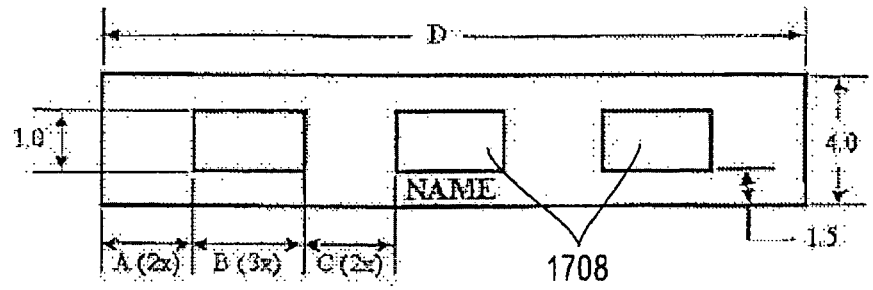
FIG. 17 is a representative template drawing generated by the method according to the present invention.

Thus, in yet another step 1316, marking templates are generated for each strap type. FIG. 17 illustrates the tools 1700 necessary to generate templates for all standard hoop straps. A representative template illustration 1706 is provided with fixed dimensions applicable to every template (e.g., template width, width of marking window 1708, etc.) and dimensions that vary from strap to strap (e.g., template length (D)). The latter set of dimensions also include dimensions for locating and cutting the marking windows 1708 (i.e., A, B, and C dimensions). When a template 1706 is applied over the appropriate strap, the marking window 1708 (which is a rectangular cut out) locates an indexing location and the user can mark that indexing location on the strap by marking on the strap through the window 1708.

The variable dimensions (e.g. A, B, C, D) for each template 1706 are found on a corresponding Table 1710. The Table 1710 identifies each template type 1714 and the unique set of dimensions 1712 for that template. For the restraint layer 900, a different template will be generated for each of the hoop straps of the toroid regions due to different elongation requirements of the straps. Hoop straps of the cylinder region may, however, utilize only a few or one universal template. The marking procedures provide specific instructions for marking each of the template of a strap type and applying the appropriate template thereon.

In a subsequent step 1318 of the process, a template is identified for a particular strap based on the strap's identifier (i.e., hoop number). Then, the template is utilized to mark the strap for indexing. This marking procedure may be employed after each of the straps are laid out in accordance with the relative positions provided in the manufacturing table. It should be noted that, in a method of assembly according to the invention, the other straps which make up the initial, uninflated configuration of the restraint layer will be similarly marked and arranged. Thus, in a subsequent step 1320 of the process described by the simplified flow chart 1300, the straps are assembled in accordance with the collection of manufacturing drawings, procedures, and templates, to position and then provide the initial, uninflated configuration.

Figure 18:
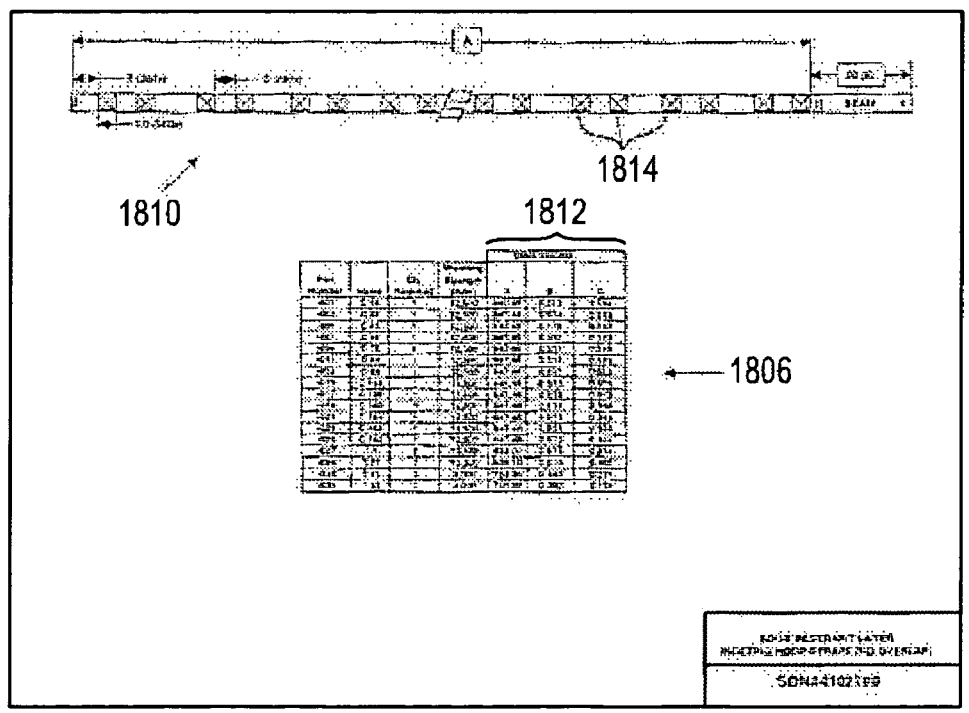
FIG. 18 is a representative manufacturing drawing sheet for indexing hoop straps, according to the present invention.

A manufacturing drawing sheet is further generated for the indexing hoop straps, such as the representative drawing 1800 in FIG. 18 (wherein like elements are referred to using like numerals in the 1800 series). The manufacturing drawing 1800 also provides a table 1806 having manufacturing dimensions specifications 1812 (e.g., "A", "B", and "C"). A representative illustration 1810 of the strap type is also provided indicating indexing locations 1814. The index locations or index gap dimensions are, of course, smaller. Manufacturing drawings are similarly provided for each of the standard longitudinal strap and the indexing longitudinal strap.

In respect to certain straps, such as the indexing longitudinal straps, conventional rulers and the like may be specified to serve as pre-marking templates. Manufacturing drawings and marking procedures will also be generated, however. The marking procedures will refer to ruler as the template.

After each of the longitudinal straps and hoop straps are premarked, the straps may be laid out on a flat surface generally in accordance with the arrangement or sequence provided by the manufacturing drawings. The strap identifiers facilitate this pre-weaving process. The strap may then be weaved together as required to form the webbing of the restraint layer. Preferably, the corresponding pars of index locations are aligned at the same time. Each index location on a hoop strap is matched with a corresponding index location on a transversely extending, interfacing longitudinal strap. Matching identifying marks facilitate these aligning steps. The step of aligning of index locations also provides for the spacing of adjacent straps in accordance with the calculated manufacturing gaps. Next, the index locations are fastened together (i.e., indexed) through employment of any one of the fastening means described above. Now complete, the shell of the restraint layer now conforms to the initial, uninflated geometric configuration. Further, it may be attached to the shell or core of the vessel. Upon inflation of the vessel, the restraint layer will expand as designed to provide a construction of longitudinal and hoop straps in accordance with the target inflated configuration (wherein the straps are spaced in accordance with the specified design gaps).

While specific embodiments and variations of the invention have been described and illustrated herein, it will be clear to those skilled in the relevant art that changes may be made in the details of the described methods and/or systems, without departing from the true spirit and scope of the invention. For example, the foregoing method may be applied in respect to other structures and other load bearing layers. Accordingly, the specifications and drawings are to be regarded in an illustrative sense, and the present invention shall be limited only by the appended claims and equivalents thereof.

What is claimed is:

1. A computer-implemented method of designing a restraint layer for an inflatable vessel, the restraint layer being constructed of a plurality of interfacing generally vertical straps and generally horizontal straps and inflatable from an initial, uninflated configuration to an inflated configuration, said method comprising the steps of:
    providing a computing processing means; and
    utilizing the computer processing means to
        input loading requirements of the inflated restraint layer,
        specify an inflated configuration of the restraint layer, including specifying a design gap between pairs of adjacent vertical or horizontal straps, whereby the adjacent straps interface with a plurality of transversely extending horizontal or vertical straps at a plurality of intersections; and
        determine an initial uninflated configuration of the restraint layer that is inflatable to achieve the specified inflated configuration, including calculating a manufacturing gap between the pairs of adjacent straps that correspond to the specified design gap in the inflated configuration of the restraint layer.

2. The method of claim 1, wherein said step of calculating the manufacturing gap includes reducing the specified design gap by elongation calculated in the transversely extending straps to determine the manufacturing gap.

3. The method of claim 1, wherein said step of calculating the manufacturing gap includes,
    calculating the load applied along the transversely extending strap during inflation, based on the user inputs;
    calculating a percentage elongation in the transversely extending straps in the vicinity of the adjacent straps based, at least partly, on the calculated loads; and
    reducing the specified design gap between the two adjacent straps by applying the percent elongation calculated for the transversely extending gaps, thereby determining the manufacturing gap between the two adjacent straps that correspond to the specified design gap.

4. The method of claim 1, wherein said step of specifying the inflated configuration includes specifying a plurality of indexing locations at a plurality of the intersections, and wherein pairs of indexing locations are spaced apart by an index gap therebetween, said method further comprising the step of calculating an initial index gap that corresponds to the index gap in the inflated configuration.

5. The method of claim 4, wherein the initial index gap being determined as a sum of a calculated manufacturing gap between the adjacent straps and a width of the transversely extending strap.

6. The method of claim 1, wherein said step of utilizing computer processing means include inputting a set of material properties for the generally vertical straps and the generally horizontal straps.

7. The method of claim 6, wherein said specifying step includes selecting a geometric configuration of the inflated restraint layer.

8. The method of claim 1, wherein said generally vertical straps are longitudinal straps and said generally horizontal straps are hoop straps, and wherein said step of specifying an inflated configuration includes defining the hoop straps and longitudinal straps of the inflated configuration, including specifying the quantity of each strap.

9. The method of claim 8, further comprising the step of outputting a set of manufacturing specifications for the restraint layer in the initial inflated configuration, whereby the set of manufacturing specifications includes a unique identifier of each of the straps and a relative position of each of the straps in the initial, uninflated configuration.

10. The method of claim 9, wherein said outputting step includes specifying for each strap, a relative position of each index location, the index location specifying an intersection between a hoop strap and a longitudinal strap whereat the two straps are to be indexed.

11. The method of claim 10, wherein said outputting step further includes generating a template positionable adjacent a strap to locate index locations thereon.

12. The method of claim 11, wherein said outputting step includes generating dimensions of the template.

13. The method of claim 12, wherein said template includes a marking window, said template being alignable adjacent a strap to align the marking window with an index location thereon.

14. The method of claim 12, wherein said step of utilizing computer processing means includes determining the index locations, for the inflated configuration, based on the calculated manufacturing gaps.

15. A method of designing a restraint layer of an inflatable vessel, the restraint layer being constructed of a web of transversely interfacing straps and inflatable from an initial, uninflated configuration to an inflated configuration, said method comprising the steps of:
provided the load requirements of the restraint layer in the inflated configuration;
providing a set of material properties for the straps;
specifying an inflated, geometric configuration of the restraint layer, including specifying a design gap between a pair of adjacent straps of the restraint layer in the inflated configuration, whereby the adjacent straps interface with a plurality of transversely extending straps at a plurality of intersections; and
calculating a manufacturing gap between the adjacent straps in the initial, uninflated configuration, the manufacturing gap corresponding to the specified design gap, said calculating step including
calculating the percent elongation at the plurality of intersections along each transversely extending strap based, at least partly, on the calculated loads; and
reducing the specified gap by the calculated percent elongation to determine the corresponding manufacturing gap.

16. The method of claim 15, wherein the specified inflated configuration includes a plurality of indexing locations at a plurality of the intersections, and wherein consecutive index locations are spaced apart by an index gap therebetween, said method further comprising the step of calculating an initial index gap for a pair of the adjacent straps, in the initial uninflated configuration, that corresponds to an index gap therebetween in the inflated configuration.

17. The method of claim 16, wherein said calculating step includes calculating the initial index gap from a sum of a calculated manufacturing gap between the adjacent straps and a width of the transversely extending straps.

18. The method of claim 15, wherein said step of specifying an inflated configuration includes defining hoop straps and longitudinal straps in the inflated configuration, including specifying the quantity of each strap and positioning each strap in the inflated configuration.

19. The method of claim 18, further comprising the step of generating tangible media providing manufacturing specifications for the restraint layer in the initial inflated configuration, whereby the manufacturing specifications include a unique identifier of each of the positioned straps and a relative position of each of the straps in the initial, uninflated configuration.

20. The method of claim 19, wherein said generating step includes specifying for each strap, a relative position of each index location, the index location specifying an intersection between a hoop strap and a longitudinal strap whereat the two straps are to be indexed.

21. The method of claim 20, further comprising the step of generating a template positionable adjacent the strap to locate index locations thereon.

22. The method of claim 21, wherein the specified inflated configuration includes a plurality of indexing locations at a plurality of the intersections, and wherein consecutive index locations are spaced apart by an index gap therebetween, said method further comprising the step of calculating an initial index gap for a pair of the adjacent straps, in the initial uninflated configuration, that corresponds to an index gap therebetween in the inflated configuration, said calculating step including calculating the initial index gap from a sum of a calculated manufacturing gap between the adjacent straps and a width of the transversely extending straps and said step of generating a template includes providing an index gap dimension on the template.

23. A method of manufacturing a restraint layer of an inflatable vessel, the restraint layer being constructed of a web of a set of first straps and a set of second straps that transversely extend relative to the first set of straps and interfaces therewith at a plurality of intersections, said method comprising the steps of:
specifying an inflated configuration of the restraint layer including the design gaps between adjacent straps of the web and indexing locations between the first straps and second straps;
providing the specifications of an initial, uninflated configuration of the restraint layer based on the inflated configuration, including the manufacturing gaps corresponding to the specified design gaps of the inflated configuration of the restraint layer, whereby the initial, uninflated configuration of the restraint layer is inflatable to achieve the inflated configuration and the specified design gaps therefor; and
assembling the straps of the initial, uninflated configuration including spacing adjacent straps according to the manufacturing gaps.

24. The method of claim 23, wherein the specified inflated configuration includes a plurality of indexing locations at a plurality of the intersections and consecutive index locations are spaced apart by an index gap therebetween, said step of providing the specifications of the initial, uninflated configuration includes specifying initial index gaps corresponding to the specified index gaps in the inflated configuration.

25. The method of claim 23, wherein said assembling step includes aligning the straps such that the indexing locations on straps of the first set align with corresponding indexing locations on straps of the second set.

26. The method of claim 25, wherein said assembling step includes marking the indexing locations on a plurality of the straps during said aligning step.

27. The method of claim 25, wherein said step of providing the specifications of the initial, uninflated configuration includes generating tangible media providing manufacturing specifications for the restraint layer in the initial, uninflated configuration, whereby the manufacturing specifications include a unique identifier of each of the positioned.

28. The method of claim 27, wherein said step of generating tangible media, includes specifying relative positions of the indexing location on the strap.

29. The method of claim 27, wherein said step of generating manufacturing specifications includes, for each strap, generating a template positionable adjacent the strap to locate indexing locations thereon.

30. The method of claim 29, wherein said step of generating manufacturing specifications includes providing the specifications for the template, including an index gap dimension on the template.

31. The method of claim 30, wherein said step of generating manufacturing specifications includes generating specifications for a plurality of template types and, wherein each of the straps is identified with one of the template types.

32. The method of claim 26, further comprising the steps of:
weaving the first set of straps with the second set of straps; and
indexing the straps of the first set with the straps of the second set by indexing the aligned corresponding indexing locations.

33. A system for manufacturing a restraint layer of an inflatable vessel, the restraint layer being constructed of a plurality of interfacing longitudinal straps and hoop straps and inflatable from an initial, uninflated configuration to an inflated configuration, said system comprising:
- a plurality of tables listing straps of a strap type and, for each strap, a unique identifier and manufacturing dimensions; and
- a plurality of templates for marking indexing locations on a strap, each template being identifiable with at least one of the straps in one of the tables and positionable adjacent the identified strap in the initially, uninflated configuration to locate index locations thereon.

34. The system of claim 33, further including a computer-generated second table for specifying a plurality of the templates, the second table providing for each of a plurality of identified straps, dimensions of a corresponding template including a dimension corresponding to an index gap between indexing locations on the identified strap in the initial, uninflated configuration.

35. The system of claim 34, further including a marking table for each strap type, the marking table providing, for each strap, dimensions for marking the strap with alignment marks, such that a specified template is positionable adjacent the strap in alignment with the alignment marks to locate index locations on the strap.

36. The system of claim 33, wherein the tables are computer-generated tables, the tables identifying each strap of the restraint layer and manufacturing dimensions therefor.

37. The system of claim 36, wherein the tables specify the relative positions of the straps.

* * * * *